US012531832B2

(12) United States Patent
Li et al.

(10) Patent No.: US 12,531,832 B2
(45) Date of Patent: Jan. 20, 2026

(54) NODE ISOLATION METHOD, SWITCHING DEVICE, AND ETHERNET STORAGE SYSTEM

(71) Applicant: Huawei Technologies Co., Ltd., Shenzhen (CN)

(72) Inventors: Jiao Li, Beijing (CN); Huafeng Wen, Nanjing (CN); Qinzhi Wu, Nanjing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 91 days.

(21) Appl. No.: 18/632,890

(22) Filed: Apr. 11, 2024

(65) Prior Publication Data
US 2024/0259344 A1 Aug. 1, 2024

Related U.S. Application Data

(63) Continuation of application No. PCT/CN2023/095299, filed on May 19, 2023.

(30) Foreign Application Priority Data

May 26, 2022 (CN) .......................... 202210583180.5

(51) Int. Cl.
*H04L 9/40* (2022.01)
*H04L 67/1097* (2022.01)
(52) U.S. Cl.
CPC ........ *H04L 63/0209* (2013.01); *H04L 63/101* (2013.01)

(58) Field of Classification Search
CPC .............. H04L 63/0209; H04L 63/101; H04L 63/0236; H04L 67/1097
See application file for complete search history.

(56) References Cited

U.S. PATENT DOCUMENTS

| 8,301,882 | B2* | 10/2012 | Smith | H04L 63/105 713/160 |
| 11,070,522 | B1* | 7/2021 | Maharia | H04L 63/1425 |
| 11,552,953 | B1* | 1/2023 | Avadhanam | H04L 63/102 |

(Continued)

FOREIGN PATENT DOCUMENTS

| CN | 105306387 A | 2/2016 |
| CN | 115174139 A | 10/2022 |
| WO | 2016069021 A1 | 5/2016 |

OTHER PUBLICATIONS

FCIA:"Fibre Channel Zoning Basics." Jun. 27, 2019. total 43 pages.

*Primary Examiner* — Darren B Schwartz
(74) *Attorney, Agent, or Firm* — Conley Rose, P.C.

(57) ABSTRACT

A node isolation method, a switching device, and an Ethernet storage system implement node isolation between zones in the Ethernet storage system. A first switching device in the Ethernet storage system determines a first access control list ACL rule between a first node and a second node, where the first switching device is an access device of the first node, the first node and the second node are located in the Ethernet storage system, and the first node and the second node correspond to a first zone; and if a packet whose source is the first node or a packet whose destination is the first node matches the first ACL rule, forwards the packet.

18 Claims, 8 Drawing Sheets

(56) References Cited

U.S. PATENT DOCUMENTS

| | | | |
|---|---|---|---|
| 2003/0152035 A1* | 8/2003 | Pettit | H04L 63/0263 |
| | | | 370/254 |
| 2005/0055573 A1* | 3/2005 | Smith | G06F 21/6218 |
| | | | 726/4 |
| 2006/0109850 A1* | 5/2006 | Otani | H04L 45/00 |
| | | | 370/395.2 |
| 2010/0043068 A1* | 2/2010 | Varadhan | H04L 45/50 |
| | | | 726/15 |
| 2012/0060206 A1 | 3/2012 | Hsu | |
| 2013/0064247 A1* | 3/2013 | Song | H04L 12/4675 |
| | | | 370/392 |
| 2014/0317684 A1* | 10/2014 | Porras | H04L 63/0227 |
| | | | 726/1 |
| 2014/0379915 A1* | 12/2014 | Yang | H04L 63/101 |
| | | | 709/225 |
| 2015/0237015 A1* | 8/2015 | Bansal | H04L 63/20 |
| | | | 726/13 |
| 2016/0127417 A1* | 5/2016 | Janssen | H04L 63/1433 |
| | | | 726/1 |
| 2016/0182557 A1* | 6/2016 | Grzelak | H04L 63/101 |
| | | | 726/1 |
| 2018/0007005 A1* | 1/2018 | Chanda | H04L 63/0236 |
| 2019/0104110 A1* | 4/2019 | Kladivo | H04L 61/5069 |
| 2020/0153834 A1* | 5/2020 | Zhuang | H04L 63/101 |
| 2022/0321566 A1* | 10/2022 | Coyle | H04L 63/101 |
| 2025/0119436 A1* | 4/2025 | Narayanan | H04L 63/08 |

* cited by examiner

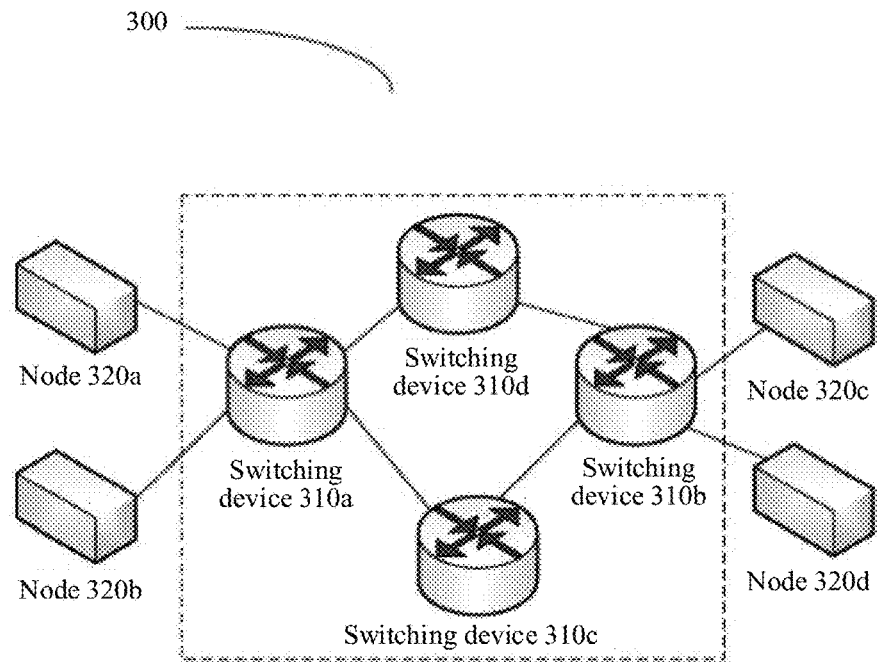
FIG. 3
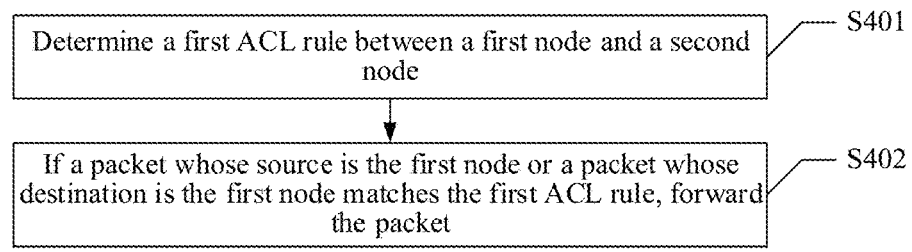
FIG. 4
| | Initiator (compute node) | Target (storage node) | Initiator&Target (composite node) |
|---|---|---|---|
| Initiator (compute node) | × | √ | √ |
| Target (storage node) | √ | × | √ |
| Initiator&Target (composite node) | √ | √ | √ |
FIG. 5

NODE ISOLATION METHOD, SWITCHING DEVICE, AND ETHERNET STORAGE SYSTEM

CROSS-REFERENCE TO RELATED APPLICATIONS

This application is a continuation of International Patent Application No. PCT/CN2023/095299 filed on May 19, 2023, which claims priority to Chinese Patent Application No. 202210583180.5 filed on May 26, 2022. The disclosures of the aforementioned applications are hereby incorporated by reference in their entireties.

TECHNICAL FIELD

The present disclosure relates to the field of Ethernet technologies, and in particular, to a node isolation method, a switching device, and an Ethernet storage system.

BACKGROUND

In a network architecture like a storage area network (SAN), a switching network including a plurality of switching devices is usually used to connect a compute node and a storage node to establish a storage system. In an architecture in which computing and storage are separated, nodes need to perform cross-network access.

An existing Ethernet storage system performs network zoning by using a zoning technology. Each zone is a communication relationship group, and a storage node and a compute node in a same zone may access each other.

If a host outside a zone manually establishes a link with a storage port in the zone for unauthorized access, security risks are posed to data stored in the zone.

SUMMARY

The present disclosure provides a node isolation method, a switching device, and an Ethernet storage system. An access control list (ACL) rule is generated based on a zone to which a node belongs, and only a packet that matches the ACL rule is permitted. In this way, unauthorized access by a node outside the zone can be avoided, and security of the Ethernet storage system can be ensured.

A first aspect of the present disclosure provides the node isolation method. A first switching device in the Ethernet storage system determines a first access control list ACL rule between a first node and a second node, where the first switching device is an access device of the first node, the first node and the second node are located in the Ethernet storage system, and the first node and the second node correspond to a first zone. If a packet whose source is the first node or a packet whose destination is the first node matches the first ACL rule, the first switching device forwards the packet.

According to the node isolation method provided in the present disclosure, in the Ethernet storage system, a switching device generates an ACL rule based on node information in a zone, and permits only a packet that matches the ACL rule. In this way, because a node outside the zone or a node in an unknown zone does not match the ACL rule delivered by the switching device, a packet is denied. Only traffic between nodes in a same zone is permitted to pass through, and unauthorized traffic between different zones or undefined zones is blocked. This can implement security isolation and line-speed traffic forwarding between nodes in the zone.

In a possible implementation of the first aspect, the first ACL rule includes one or more of the following: a packet whose source is the first node and whose destination is the second node in an inbound direction; and a packet whose destination is the first node and whose source is the second node in an outbound direction.

According to the node isolation method provided in the present disclosure, specifically, the generated ACL rule may include a packet sent by the first node to another node in a zone in which the first node is located, or a packet received by the first node and sent by another node in the zone in which the first node is located. It should be noted that in the Ethernet storage system, because the first node may belong to different zones, the generated ACL rule may involve nodes in a plurality of zones.

In a possible implementation of the first aspect, the determining a first ACL rule between a first node and a second node includes: If the first node and the second node have different roles, the first ACL rule is determined, where the roles include a compute node, a storage node, or a composite node; or if both the first node and the second node are composite nodes, the first ACL rule is determined, where the composite node is a storage node related to data backup.

According to the node isolation method provided in the present disclosure, in consideration of an actual communication requirement in a service scenario, no ACL rule is generated between two compute nodes, and no ACL rule is generated between two storage nodes. Therefore, ACL rule resources can be saved.

In a possible implementation of the first aspect, before the determining a first ACL rule between a first node and a second node, the method further includes: receiving an online message of the first node, where the online message of the first node includes an identifier of the first node; determining, based on the identifier of the first node, the first zone corresponding to the first node; and determining the second node based on the first zone, where the second node is an online node corresponding to the first zone.

According to the node isolation method provided in the present disclosure, the first switching device receives the online message of the first node, and then determines, based on the identifier of the first node, the zone in which the first node is located, so that an ACL rule can be generated for the first node and another online node in the zone.

In a possible implementation of the first aspect, an offline message of the second node or a zone update message of the second node is obtained, where the zone update message indicates that the second node is switched from the first zone to a second zone; and the first ACL rule is deleted based on the offline message or the zone update message of the second node.

According to the node isolation method provided in the present disclosure, when a node in a zone goes offline or a node exits the zone, an ACL rule associated with the node needs to be deleted.

In a possible implementation of the first aspect, the Ethernet storage system further includes a third node, the third node corresponds to the first zone, an access device of the third node is a second switching device in the Ethernet storage system, and the method further includes: obtaining an online message of the third node, where the online message of the third node includes an identifier of the third node; determining, based on the identifier of the third node, that the third node corresponds to the first zone; and determining a second ACL rule between the first node and the third node, where the second ACL rule includes one or more of the following: a packet whose source is the first node and whose destination is the third node in the inbound direction; and a packet whose destination is the first node and whose source is the third node in the outbound direction.

According to the node isolation method provided in the present disclosure, the first switching device may obtain, based on a switching device network, information about the third node that goes online from another switching device. If the third node is also a node in the first zone, the first switching device generates the ACL rule for a packet between the first node and the third node.

In a possible implementation of the first aspect, the method further includes: obtaining an offline message of the first node; and deleting the first ACL rule and the second ACL rule based on the offline message of the first node.

According to the node isolation method provided in the present disclosure, after the first node goes offline, all ACL rules related to the first node are deleted.

In a possible implementation of the first aspect, the Ethernet storage system includes a first node group and a second node group, both a node in the first node group and a node in the second node group correspond to the first zone, the first node group includes the first node, the second node group includes the second node, and any node in the first node group is different from any node in the second node group; the method further includes: determining, based on an identifier of the first node, that the first node corresponds to the first node group; and the determining a first ACL rule between a first node and a second node includes: determining a first node group ACL rule between the first node group and the second node group, where the first node group ACL rule is used to determine an access rule between any node in the first node group and any node in the second node group.

According to the node isolation method provided in the present disclosure, in some service scenarios, there are a large quantity of nodes in the Ethernet storage system. In consideration of a limited quantity of ACL rules, ACL resources can be saved by delivering ACL group rules by node grouping.

In a possible implementation of the first aspect, the first node group ACL rule includes one or more of the following: a packet whose source is the first node group and whose destination is the second node group in the inbound direction; and a packet whose destination is the first node group and whose source is the second node group in the outbound direction.

According to the node isolation method provided in the present disclosure, specifically, the generated ACL rule may include a packet sent by any node in the first node group to any node in the second node group, or a packet that is sent by any node in the second node group and that is received by any node in the first node group.

In a possible implementation of the first aspect, all nodes in the first node group have a same role, and all nodes in the second node group have a same role; and the determining a first node group ACL rule between the first node group and the second node group includes: If the first node and the second node have different roles, the first node group ACL rule is determined, where the roles include a compute node, a storage node, or a composite node; or if both the first node and the second node are composite nodes, the first node group ACL rule is determined, where the composite node is a storage node related to data backup.

According to the node isolation method provided in the present disclosure, nodes in one node group have a same role. In consideration of an actual communication requirement in a service scenario, no ACL rule is generated for two node groups that are both compute nodes, and no ACL rule is generated for two node groups that are both storage nodes. Therefore, ACL rule resources can be saved.

In a possible implementation of the first aspect, the second node is the only online node in the second node group; and the method further includes: obtaining a message indicating that the second node goes offline; and deleting a rule associated with the second node group from the first node group ACL rule.

In a possible implementation of the first aspect, the Ethernet storage system further includes a third node group, the third node group corresponds to the first zone, the third node group includes a third node, any node in the third node group is different from any node in the first node group, any node in the third node group is different from any node in the second node group, and an access device of the third node is a second switching device in the Ethernet storage system; and the method further includes: obtaining an online message of the third node, where the online message of the third node carries an identifier of the third node; determining, based on the identifier of the third node, that the third node corresponds to the third node group, and the third node group corresponds to the first zone; and determining a second node group ACL rule between the first node group and the third node group, where the second node group ACL rule includes one or more of the following: a packet whose source is the first node group and whose destination is the third node group in the inbound direction; and a packet whose destination is the first node group and whose source is the third node group in the outbound direction.

According to the node isolation method provided in the present disclosure, the first switching device may obtain, based on a switching device network, information about the third node that goes online from another switching device. The third node corresponds to the third node group, and the third node group corresponds to the first zone. In this case, the first switching device generates the ACL rule based on the first node group and the third node group.

In a possible implementation of the first aspect, the first node group ACL rule includes: a packet whose source is the first node group in the inbound direction; and a packet whose destination is the first node group and whose source is the second node group in the outbound direction.

According to the node isolation method provided in the present disclosure, the first node group ACL rule does not limit a packet sent by the first node group, and rule confirmation is performed on a source node group and a destination node group of the packet only in an outbound direction of the packet. Different from a memory resource, an Ethernet chip has small storage space and high costs, and the first switching device does not need to store information about a node group connected to another switching device. In this way, chip storage resources of the switching device can be saved.

In a possible implementation of the first aspect, the method further includes: receiving a first packet whose source is the first node; determining, based on a source internet protocol (IP) address of the first packet, a first node group identifier corresponding to the first node; adding the first node group identifier to the first packet to obtain a second packet; and processing the second packet according to the first node group ACL rule.

According to the node isolation method provided in the present disclosure, the first switching device adds the first node group identifier to the first packet, so that an access switching device of a receiving node can directly obtain information about a node group corresponding to the source of the packet.

In a possible implementation of the first aspect, the method further includes: receiving a third packet, where the third packet includes a second node group identifier and a destination IP address, the destination IP address is an IP address of the first node, and the second node group identifier indicates that the third packet is from a node in the second node group; determining, based on the destination IP address, that a destination of the third packet belongs to the first node group; and forwarding the second packet to the first node according to the first node group ACL rule.

According to the node isolation method provided in the present disclosure, the third packet received by the first switching device includes the second node group identifier that indicates the source of the packet, and further includes the destination IP address that indicates a destination node of the packet. It may be determined, based on preset information of the first switching device, that a node corresponding to the destination IP address belongs to the first node group. Then an ACL rule is queried based on the node group information of the source of the packet and destination node group information. If the ACL rule is matched, the packet is forwarded.

In a possible implementation of the first aspect, the first node is the only online node in the first node group; and the method further includes: obtaining a message indicating that the first node goes offline; and deleting the first node group ACL rule and the second node group ACL rule.

In a possible implementation of the first aspect, the first node group ACL rule includes: a packet whose source is the first node group and whose destination is a third group in the inbound direction; and a packet whose destination is the first node group in the outbound direction.

A second aspect of the present disclosure provides a switching device, including: a determining module configured to determine a first access control list ACL rule between a first node and a second node, where a first switching device is an access device of the first node, the first node and the second node are located in an Ethernet storage system, and the first node and the second node correspond to a first zone; and a forwarding module configured to: if a packet whose source is the first node or a packet whose destination is the first node matches the first ACL rule, forward the packet.

In a possible implementation of the second aspect, the first ACL rule includes one or more of the following: a packet whose source is the first node and whose destination is the second node in an inbound direction; and a packet whose destination is the first node and whose source is the second node in an outbound direction.

In a possible implementation of the second aspect, the determining module is specifically configured to: determine the first ACL rule if the first node and the second node have different roles, where the roles include a compute node, a storage node, or a composite node; or determine the first ACL rule if both the first node and the second node are composite nodes, where the composite node is a storage node related to data backup.

In a possible implementation of the second aspect, before determining the first ACL rule between the first node and the second node, the switching device further includes: a receiving module configured to receive an online message of the first node, where the online message of the first node includes an identifier of the first node; and the determining module is further configured to: determine, based on the identifier of the first node, the first zone corresponding to the first node; and determine the second node based on the first zone, where the second node is an online node corresponding to the first zone.

In a possible implementation of the second aspect, the switching device further includes: an obtaining module configured to: obtain an offline message of the second node or a zone update message of the second node, where the zone update message indicates that the second node is switched from the first zone to a second zone; and the determining module is further configured to delete the first ACL rule based on the offline message or the zone update message of the second node.

In a possible implementation of the second aspect, the Ethernet storage system further includes a third node, the third node corresponds to the first zone, an access device of the third node is a second switching device in the Ethernet storage system, the obtaining module is further configured to: obtain an online message of the third node, where the online message of the third node includes an identifier of the third node; and the determining module is further configured to determine, based on the identifier of the third node, that the third node corresponds to the first zone; and determine a second ACL rule between the first node and the third node, where the second ACL rule includes one or more of the following: a packet whose source is the first node and whose destination is the third node in the inbound direction; and a packet whose destination is the first node and whose source is the third node in the outbound direction.

In a possible implementation of the second aspect, the obtaining module is further configured to: obtain an offline message of the first node; and the determining module is further configured to delete the first ACL rule and the second ACL rule based on the offline message of the first node.

In a possible implementation of the second aspect, the Ethernet storage system includes a first node group and a second node group, both a node in the first node group and a node in the second node group correspond to the first zone, the first node group includes the first node, the second node group includes the second node, and any node in the first node group is different from any node in the second node group; the determining module is further configured to determine, based on an identifier of the first node, that the first node corresponds to the first node group; and the determining module is specifically configured to: determine a first node group ACL rule between the first node group and the second node group, where the first node group ACL rule is used to determine an access rule between any node in the first node group and any node in the second node group.

In a possible implementation of the second aspect, the first node group ACL rule includes one or more of the following: a packet whose source is the first node group and whose destination is the second node group in the inbound direction; and a packet whose destination is the first node group and whose source is the second node group in the outbound direction.

In a possible implementation of the second aspect, all nodes in the first node group have a same role, and all nodes in the second node group have a same role; and the determining module is specifically configured to: determine the first node group ACL rule if the first node and the second node have different roles, where the roles include a compute node, a storage node, or a composite node; or determine the first node group ACL rule if both the first node and the second node are composite nodes, where the composite node is a storage node related to data backup.

In a possible implementation of the second aspect, the Ethernet storage system further includes a third node group, the third node group corresponds to the first zone, the third node group includes a third node, any node in the third node group is different from any node in the first node group, any node in the third node group is different from any node in the second node group, and an access device of the third node is a second switching device in the Ethernet storage system; the obtaining module is further configured to: obtain an online message of the third node, where the online message of the third node carries an identifier of the third node; and the determining module is further configured to: determine, based on the identifier of the third node, that the third node corresponds to the third node group, and the third node group corresponds to the first zone; and determine a second node group ACL rule between the first node group and the third node group, where the second node group ACL rule includes one or more of the following: a packet whose source is the first node group and whose destination is the third node group in the inbound direction; and a packet whose destination is the first node group and whose source is the third node group in the outbound direction.

In a possible implementation of the second aspect, the first node group ACL rule includes: a packet whose source is the first node group in the inbound direction; and a packet whose destination is the first node group and whose source is the second node group in the outbound direction.

In a possible implementation of the second aspect, the receiving module is further configured to: receive a first packet whose source is the first node; the determining module is further configured to determine, based on a source IP address of the first packet, a first node group identifier corresponding to the first node; and the forwarding module is further configured to: add the first node group identifier to the first packet to obtain a second packet; and process the second packet according to the first node group ACL rule.

In a possible implementation of the second aspect, the obtaining module is further configured to receive a third packet, where the third packet includes a second node group identifier and a destination IP address, the destination IP address is an IP address of the first node, and the second node group identifier indicates that the third packet is from a node in the second node group; the determining module is further configured to determine, based on the destination IP address, that a destination of the third packet belongs to the first node group; and the forwarding module is further configured to: forward the second packet to the first node according to the first node group ACL rule.

A third aspect of the present disclosure provides a switching device, including: a memory, where the memory stores computer-readable instructions; and a processor connected to the memory, where when the computer-readable instructions are executed by the processor, the switching device is enabled to implement the method according to any one of the first aspect and the possible implementations.

A fourth aspect of the present disclosure provides a computer program product, including computer-readable instructions, where when the computer-readable instructions are run on a computer, the computer is enabled to perform the method according to any one of the first aspect and the possible implementations.

A fifth aspect of the present disclosure provides a computer-readable storage medium, where the computer-readable storage medium stores instructions, and when the instructions are run on a computer, the computer is enabled to perform the method according to any one of the first aspect and the possible implementations.

A sixth aspect of the present disclosure provides an Ethernet storage system, including a first switching device, a first node, and a second node, where the first switching device is an access device of the first node, the first node and the second node correspond to a first zone, and the first switching device is configured to: determine a first access control list ACL rule between the first node and the second node; and if a packet whose source is the first node or a packet whose destination is the first node matches the first ACL rule, forward the packet.

In a possible implementation of the sixth aspect, the Ethernet storage system is further configured to perform the method according to any one of the first aspect and the possible implementations.

A seventh aspect of the present disclosure provides a chip, including a processor. The processor is configured to read and execute a computer program stored in a memory, to perform the method according to any possible implementation of any one of the foregoing aspects. Optionally, the chip includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

For technical effects brought by any one of the second aspect, the third aspect, the fourth aspect, the fifth aspect, the sixth aspect, the seventh aspect, and the implementations of the second aspect, the third aspect, the fourth aspect, the sixth aspect, or the seventh aspect, refer to technical effects brought by corresponding implementations of the first aspect.

According to the node isolation method provided in the present disclosure, in the Ethernet storage system, a switching device generates an ACL rule based on node information in a zone, permits only a packet that matches the ACL rule. In this way, because a node outside the zone or a node in an unknown zone does not match the ACL rule delivered by the switching device, a packet corresponding to the node is denied. Only traffic between nodes in a same zone is permitted to pass through, and unauthorized traffic between different zones or undefined zones is blocked. This can implement security isolation and line-speed traffic forwarding between nodes in the zone.

BRIEF DESCRIPTION OF DRAWINGS

FIG. 3 is an architectural diagram of another application scenario of a node isolation method according to an embodiment of the present disclosure;

FIG. 4 is a schematic diagram of an embodiment of a node isolation method according to an embodiment of the present disclosure;

FIG. 5 is a schematic diagram of a role interworking relationship in a node isolation method according to an embodiment of the present disclosure;

DESCRIPTION OF EMBODIMENTS

Figure 1:
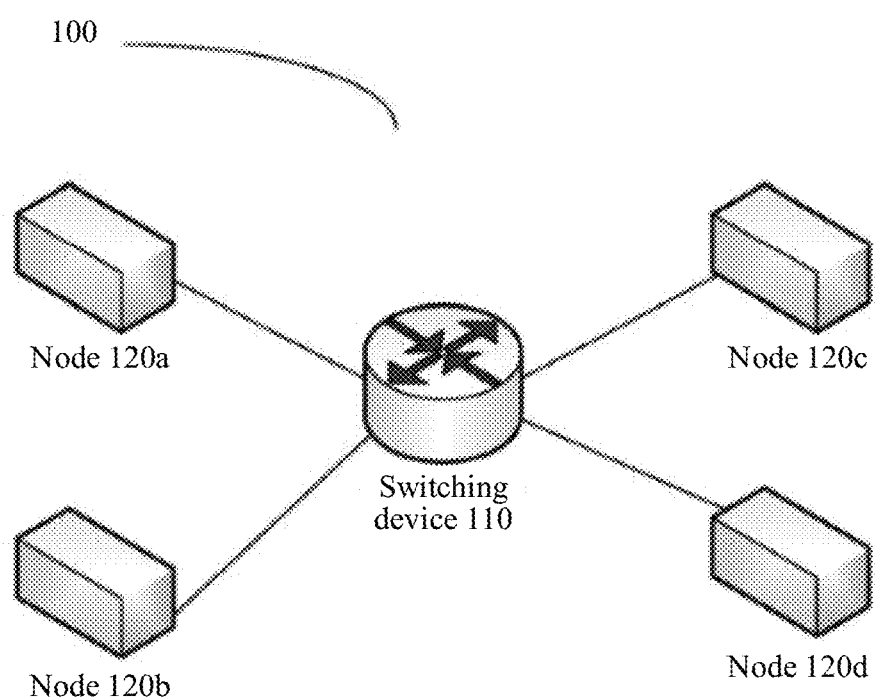
FIG. 1 is an architectural diagram of an application scenario of a node isolation method according to an embodiment of the present disclosure.

Embodiments of the present disclosure disclose a node isolation method, applied to a first switching device in an Ethernet storage system, to implement node isolation between zones.

The following describes embodiments of the present disclosure with reference to accompanying drawings. It is clear that the described embodiments are merely some but not all of embodiments of the present disclosure. A person of ordinary skill in the art may know that with technical development and emergence of a new scenario, the technical solutions provided in embodiments of the present disclosure are also applicable to a similar technical problem.

In the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in the present disclosure do not mean that the steps in the method process need to be performed in a time/logical sequence indicated by the names or numbers. An execution sequence of the steps in the process that have been named or numbered can be changed based on a technical objective to be achieved, provided that same or similar technical effects can be achieved.

For ease of understanding, some technical terms in embodiments of the present disclosure are briefly described below.

An ACL is a set of one or more rules. A device performs packet matching based on these rules to filter out a specific packet, and permits or denies the packet according to a processing policy of a service module to which the ACL is applied.

Embodiments of the present disclosure are applied to an Ethernet storage system. The Ethernet storage system includes a plurality of nodes and at least one switching device (the switching device in the present disclosure is an Ethernet switching device). Each node of the plurality of nodes is connected to a corresponding switching device (which may be referred to as an edge switching device or a leaf switching device), to release information to the switching device or receive information from the switching device. In terms of forms, the node in the present disclosure may be a physical device, or may be a virtual device deployed on the physical device. When the node is the virtual device, the plurality of nodes may be carried on a same physical device. The physical device may be a device that can carry a node, for example, a physical server, a workstation, a mobile station, or a general-purpose computer. In terms of functions (or roles), the node in the present disclosure may be a compute node (for example, a server), a storage node (for example, a storage array), or a composite node (for example, a storage array configured to replicate and back up data).

In an implementation, the Ethernet storage system may be an Ethernet storage system 100 shown in FIG. 1, including a switching device 110 and a plurality of nodes 120 (nodes 120*a* to 120*d* shown in FIG. 1) connected to the switching device 110. In another implementation, the Ethernet storage system may be an Ethernet storage system 200 shown in FIG. 2, including a plurality of switching devices 210 (switching devices 210*a* to 210*c* shown in the figure) and a plurality of nodes 220 (nodes 220*a* to 220*f* shown in FIG. 2). Each node of the nodes 220*a* to 220*f* is connected to a corresponding switching device (that is, an edge switching device), and the plurality of switching devices 210*a* to 210*c* are interconnected. In still another implementation, the Ethernet storage system is an Ethernet storage system 300 shown in FIG. 3, including a plurality of switching devices 310 (switching devices 310*a* to 310*d* shown in the figure) and a plurality of nodes 320 (nodes 320*a* to 320*d* shown in FIG. 3). Each node of the plurality of nodes 320*a* to 320*d* is connected to a corresponding edge switching device, and the plurality of switching devices 310*a* to 310*d* include edge switching devices 310*a* and 310*b* and backbone switching devices 310*c* and 310*d*. The edge switching devices 310*a* and 310*b* communicate with each other via the backbone switching devices 310*c* and 310*d*. Optionally, the Ethernet storage system may further include an aggregation switching device (not shown in the figure). The aggregation switching device is configured to connect the backbone switching device and the edge switching device. When the Ethernet storage system includes a plurality of switching devices, the plurality of switching devices form a switching network (which may be referred to as a fabric), and the switching network is transparent to the node. For example, the switching devices 210*a* to 210*c* in FIG. 2 form a switching network, and the switching devices 310*a* to 310*d* in FIG. 3 form a switching network. In the present disclosure, a node connected to a switching device is referred to as a local node of the switching device, and the switching device is referred to as an access device of the local node. For example, in FIG. 3, the nodes 320*a* and 320*b* are local nodes of the switching device 310*a*, and the switching device 310*b* is an access device of the nodes 320*c* and 320*d*.

When the Ethernet storage system includes the plurality of switching devices, at least one switching device in the plurality of switching devices is configured as a reflector (which can implement a function of the reflector). The reflector is equivalent to a collection point in a switching network, receives information sent by one switching device, and sends the information to another switching device, to implement information synchronization in the entire switching network. For example, the switching device 210*c* in FIG. 2 may be configured as a reflector, and the switching devices 310*c* and 310*d* in FIG. 3 may be configured as reflectors.

In a zoning technology of the Ethernet storage system, a node may belong to one or more zones, and a node outside a zone may establish a communication connection to a node in the zone through a manual operation for unauthorized access. In this case, security risks are posed to data stored in the zone. In view of this, an embodiment of the present disclosure provides a node isolation method used to implement security isolation between nodes in different zones. With reference to FIG. 4 to FIG. 8, the following describes the node isolation method provided in this embodiment of the present disclosure.

Refer to FIG. 4. This embodiment of the present disclosure provides a node isolation method 400. The node isolation method 400 may be applied to the edge switching devices in scenarios shown in FIG. 1 to FIG. 3. A first switching device involved in this embodiment is equivalent to the switching device 110 shown in FIG. 1, the switching devices 210a to 210c shown in FIG. 2, or the switching devices 310a to 310b shown in FIG. 3. The method 400 includes steps S401 and S402. It should be noted that the first switching device may be any edge switching device in a switching network (fabric) of the Ethernet storage system, and a specific switching network structure is not limited.

Figure 2:
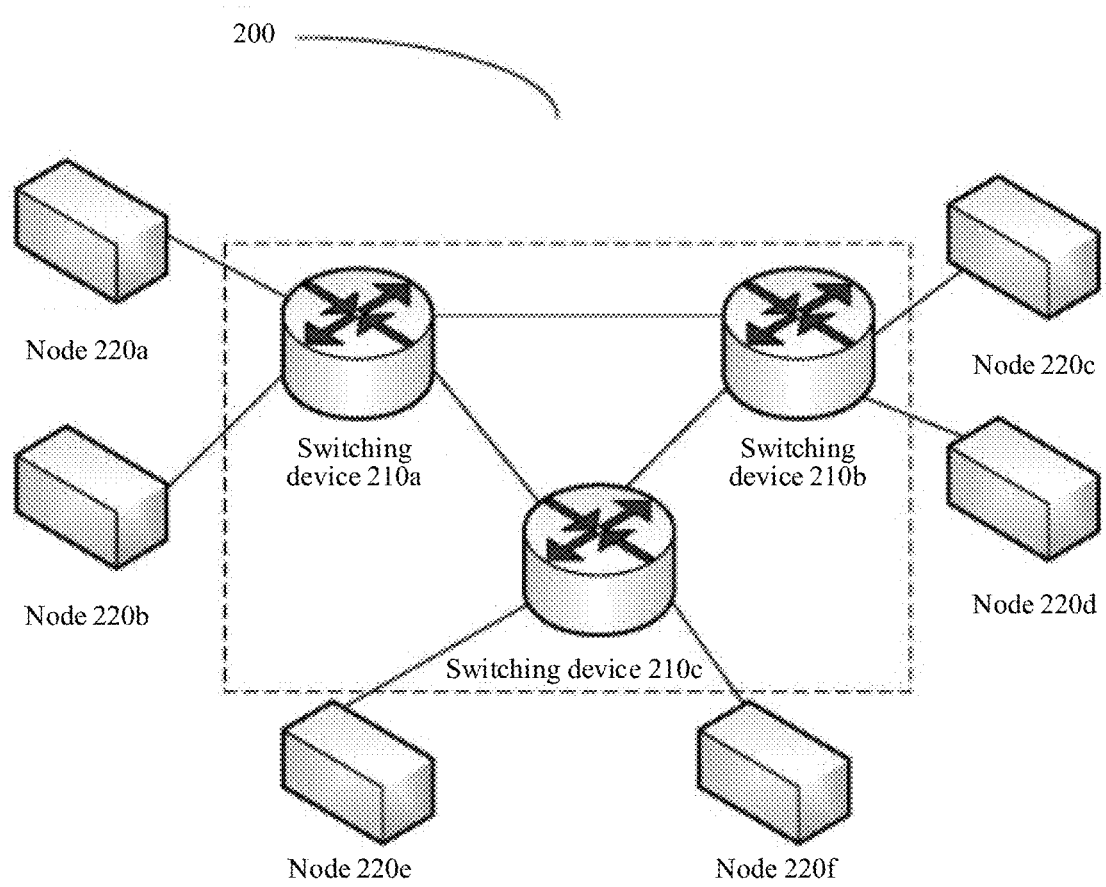
FIG. 2 is an architectural diagram of another application scenario of a node isolation method according to an embodiment of the present disclosure.

A first node, a second node, and a third node in this embodiment each are equivalent to the node 120 shown in FIG. 1, the node 220 shown in FIG. 2, or the node 320 shown in FIG. 3.

S401: Determine a first ACL rule between the first node and the second node.

The Ethernet storage system includes the first node and the second node, and both the first node and the second node correspond to a first zone. The first node is a local node of the first switching device, in other words, the first switching device is an access device of the first node. The first switching device determines the first ACL rule between the first node and the second node. The first ACL rule includes one or more of the following: a packet whose source is the first node and whose destination is the second node in the inbound direction; and a packet whose destination is the first node and whose source is the second node in the outbound direction. In other words, for a packet sent to the first node or a packet sent by the first node, the first switching device determines the ACL rule.

It should be noted that, optionally, before the first ACL rule between the first node and the second node is determined, the method further includes: receiving an online message of the first node, where the online message of the first node includes an identifier of the first node, and the identifier of the first node may be any one or more of an Internet Protocol (IP) address, a media access control (MAC) address, a node name, a node number, or a node connection relationship that are of the first node. The node connection relationship indicates an identifier of a switching device connected to the first node, and may further indicate a port that is of the switching device and that is connected to the first node. The first zone corresponding to the first node is determined based on the identifier of the first node. Based on a zoning technology in an Ethernet storage network, the switching network may obtain node information in a dynamic sensing zone. The first switching device determines nodes included in the first zone, and may determine the ACL rule for the first node and another node in the first zone. Optionally, the second node is determined based on the first zone, and the first switching device determines the ACL rule between the first node and the second node. In a possible implementation, the first switching device determines an online node in the first zone, and determines the ACL rule for the first node and another online node in the first zone. In other words, the second node is the online node corresponding to the first zone. It should be noted that the ACL rule is generally stored in a ternary content-addressable memory (TCAM) chip, and one ACL rule corresponds to one TCAM entry. The TCAM chip is widely used for fast search and access control. Different from memory resources, a TCAM has a small storage space due to costs and power consumption. TCAM entry resources used to store the ACL rule are not large. TCAM storage resources are key resources of a switching device. In this implementation, the ACL rule is generated only based on the online node, so that storage resources of the TCAM chip can be saved.

In a possible implementation, the Ethernet storage system further includes the third node, where the third node corresponds to the first zone, an access device of the third node is a second switching device in the Ethernet storage system. Based on the zoning technology in the Ethernet storage network, the switching network may obtain online information of a local node of another switching device in the dynamic sensing zone. For example, when a local node of the second switching device, that is, the third node, goes online, the first switching device obtains an online message of the third node, where the online message of the third node includes an identifier of the third node. Similarly, the identifier of the third node may be any one or more of an IP address, a MAC address, a device name, a device number, or a device connection relationship that are of the third node. The device connection relationship indicates an identifier of the second switching device, and may further indicate a port that is of the switching device and that is connected to the third node. The first switching device may determine, based on the identifier of the third node, that the third node corresponds to the first zone, and may further determine a second ACL rule between the first node and the third node. Optionally, the second ACL rule includes one or more of the following: a packet whose source is the first node and whose destination is the third node in the inbound direction; and a packet whose destination is the first node and whose source is the third node in the outbound direction.

In consideration of access requirement differences between nodes in an actual application scenario, refer to FIG. 5. Data transmission between nodes of different roles is intuitively displayed. An initiator usually refers to a compute node, a target usually refers to a storage node, and a node that can be used as both an initiator and a target (initiator & target) usually refers to a composite node, for example, a storage array used for data replication and backup. A symbol "√" indicates that two types of corresponding nodes need to communicate with each other, and an ACL rule between the two types of nodes need to be determined. A symbol "×" indicates that the two types of nodes do not need to communicate with each other, and the ACL rule between the two types of nodes do not need to be determined. Generally, data transmission needs to be performed between the compute node and the storage node, between the compute node and the composite node, and between the storage node and the composite node. Alternatively, in a data backup scenario, data transmission needs to be performed between two composite nodes. However, there is no access requirement between two compute nodes, and there is no access requirement between two storage nodes. Therefore, the first switching device may determine an ACL rule based on a role of a node. Optionally, if the first node and the second node have different roles, the first ACL rule is determined, where the roles include a compute node, a storage node, or a composite node; or if both the first node and the second node are composite nodes, the first ACL rule is determined, where the composite node is a storage node related to data backup. Because the switching device automatically senses a port role and selectively determines the ACL rule, invalid resource occupation is avoided.

In some possible implementations, cases in which a node related to the determined ACL rule may go offline, a zone of the node may change, and the like may occur. The following describes the cases one by one.

Optionally, if the second node goes offline or exits the first zone, the first ACL rule is deleted. The first switching device obtains an offline message of the second node or a zone update message of the second node, where the zone update message indicates that the second node is switched from the first zone to a second zone; and deletes the first ACL rule based on the offline message or the zone update message of the second node.

Similarly, if the third node goes offline or exits the first zone, the first switching device may also delete the second ACL rule. If the first node goes offline, the first switching device deletes the first ACL rule and the second ACL rule.

It may be understood that, if a fourth node is added to the first zone due to a zone change, the first switching device may obtain an online message of the fourth node, and determine an ACL rule between the first node and the fourth node.

In consideration of an actual application scenario in which the Ethernet switching network includes a large quantity of nodes, for example, hundreds or even thousands of nodes, and a quantity of ACL rules stored in a switching device is limited, to reduce the limited quantity of ACL rules in the switching device, in the node isolation method provided in this embodiment of the present disclosure, node grouping is performed, and ACL rules are generated based on node groups. This reduces the quantity of ACL rules and saves storage resources. The following describes in detail a node grouping policy and a process of generating the ACL rules based on the node groups.

Optionally, the node groups are determined based on locations or functions of the nodes. For example, the node groups are divided based on a computing cluster granularity or by using a storage node as a unit. Information about the node groups may be preset by a developer in the first switching device, or may be obtained from another switching device in the switching network. A method for node grouping and a manner of obtaining the information about the node groups is not limited in this embodiment of the present disclosure. In a possible implementation, all nodes in a first node group have a same role, and all nodes in a second node group have a same role. For example, all nodes in the first node group are compute nodes, or all nodes in the first node group are storage nodes, or all nodes in the first node group are composite nodes.

In another possible implementation, the first switching device may determine an ACL rule between node groups, and implement isolation based on the node groups. Specifically, the first switching device may obtain the information about the node groups, including a node group identifier of each node group and a node corresponding to each node group. The nodes in the node groups belong to a same zone, and both the node in the first node group and the node in the second node group correspond to the first zone. Each node group includes at least one node, the first node group includes the first node, and the second node group includes the second node. Any node in the first node group is different from any node in the second node group. In other words, one node cannot belong to two node groups at the same time.

The Ethernet storage system includes the first node group and the second node group. It is determined, based on the identifier of the first node, that the first node corresponds to the first node group. A first node group ACL rule between the first node group and the second node group is determined, where the first node group ACL rule is used to determine an access rule between any node in the first node group and any node in the second node group. The first node group ACL rule includes one or more of the following: a packet whose source is the first node group and whose destination is the second node group in the inbound direction; and a packet whose destination is the first node group and whose source is the second node group in the outbound direction. The ACL rules are determined based on the node groups, so that the quantity of ACL rules can be reduced, and storage space can be saved.

In a possible implementation, the Ethernet storage system further includes a third node group, the third node group corresponds to the first zone, an access device of the third node is the second switching device in the Ethernet storage system, the third node group includes the third node, any node in the third node group is different from any node in the first node group, and any node in the third node group is different from any node in the second node group. Based on the zoning technology in the Ethernet storage network, the switching network may obtain online information of a local node of another switching device in the dynamic sensing zone. For example, when the local node of the second switching device, that is, the third node, goes online, the first switching device obtains the online message of the third node, where the online message of the third node includes the identifier of the third node. The first switching device may determine, based on the identifier of the third node, that the third node corresponds to the third node group, and the third node group corresponds to the first zone, and determine a second node group ACL rule between the first node group and the third node group. Optionally, the second node group ACL rule includes one or more of the following: a packet whose source is the first node group and whose destination is the third node group in the inbound direction; and a packet whose destination is the first node group and whose source is the third node group in the outbound direction.

In a possible implementation, if the first node is the only online node in the first node group, after obtaining a message indicating that the first node goes offline, the first switching device deletes the first node group ACL rule and the second node group ACL rule. Similarly, if all nodes in the second node group go offline, the first node group ACL rule is deleted; or if all nodes in the third node group go offline, the second node group ACL rule is deleted.

Generally, data transmission needs to be performed between the compute node and the storage node, between the compute node and the composite node, and between the storage node and the composite node. Alternatively, in a data backup scenario, data transmission needs to be performed between composite nodes. However, there is no access requirement between two compute nodes, and there is no access requirement between two storage nodes. Therefore, the first switching device may determine a node group ACL rule based on a role of a node. If the first node and the second node have different roles, the first node group ACL rule is determined, where the roles include a compute node, a storage node, or a composite node; or if both the first node and the second node are composite nodes, the first node group ACL rule is determined, where the composite node is a storage node related to data backup.

In a scenario in which the ACL rule is determined based on node grouping, the information about the node group needs to occupy storage resources of the switching device. To further save the storage resources, the switching device may store only local device-related node group information.

In a possible implementation, the first node group ACL rule includes: a packet whose source is the first node group in the inbound direction; and a packet whose destination is the first node group and whose source is the second node group in the outbound direction. In other words, the first node group ACL rule does not limit a packet sent by the first node group, and is used to perform rule confirmation on a source node group and a destination node group of the packet only in an outbound direction of the packet. In this way, the first switching device may not need to store information about a node group connected to another switching device and storage resources can be saved.

Specifically, the first switching device receives a first packet whose source is the first node; determines, based on a source IP address of the first packet, a first node group identifier corresponding to the first node; adds the first node group identifier to the first packet to obtain a second packet; and processes the second packet according to the first node group ACL rule. If an access device of a destination node of the first packet is the second switching device, the second switching device may obtain, based on the first node group identifier included in the second packet, information indicating that the packet is from the first node group, and does not need to search, based on the identifier of the first node, for a node group to which the packet belongs. Therefore, the second switching device does not need to store information about the node in the first node group.

Further, the first switching device receives a third packet, where the third packet includes a second node group identifier and a destination IP address, the destination IP address is an IP address of the first node, and the second node group identifier indicates that the third packet is from a node in the second node group; determines, based on the destination IP address, that a destination (that is, a destination node) of the third packet belongs to the first node group; and forwards the second packet to the first node according to the first node group ACL rule. The first switching device receives the third packet forwarded by another switching device. Because the third packet includes the second node group identifier, the first switching device does not need to store information about a node group corresponding to a local node of the another switching device, so that storage resources can be saved.

S402: If a packet whose source is the first node or a packet whose destination is the first node matches the first ACL rule, forward the packet.

The packet is forwarded if the packet whose source is the first node or the packet whose destination is the first node matches the first ACL rule. In other words, the packet is permitted. In some possible implementations, if the packet does not match the first ACL rule, the packet is denied.

In an implementation, the ACL rule in the present disclosure does not include an action. A switching device forwards a received packet when the packet matches any ACL rule, and denies the packet when the packet does not match any ACL rule.

In an implementation, the ACL rule in the present disclosure further includes an action, and the action is "permit" or "deny". When the action in the ACL rule that matches the received packet is permit, the switching device forwards the packet, and when the action in the ACL rule that matches the packet is deny, the switching device discards the packet.

According to the node isolation method provided in this embodiment of the present disclosure, frame-based filtering and check can be implemented according to the ACL rule, and the ACL rule can be dynamically delivered and managed, to ensure that accurate filtering and isolation can be implemented in scenarios in which a node goes online and offline, a zone member changes, and the like.

Figure 6:
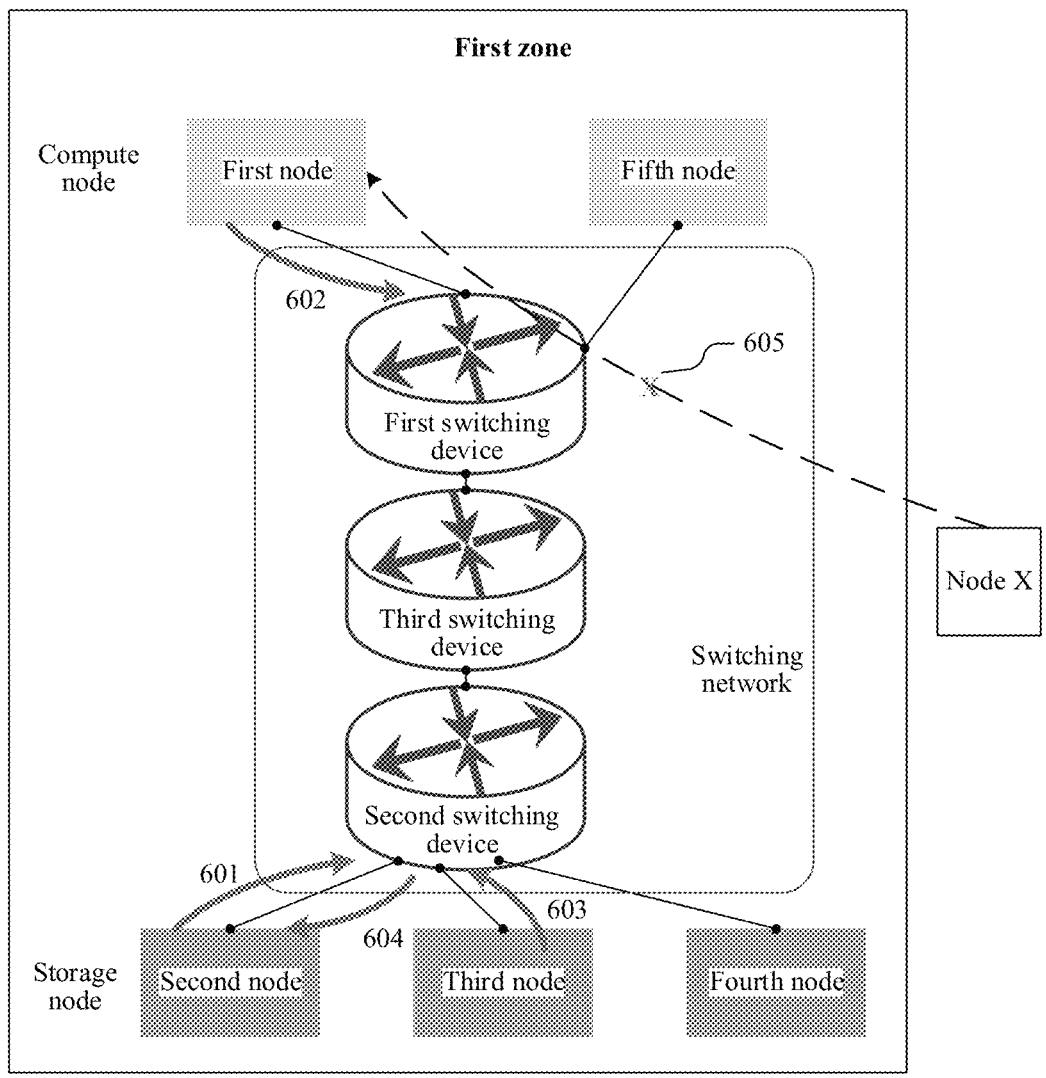
FIG. 6 is a schematic diagram of another embodiment of a node isolation method according to an embodiment of the present disclosure.

Refer to FIG. 6. The following describes, with reference to a specific example, a node isolation method provided in an embodiment of the present disclosure.

For example, in this embodiment, a first zone includes a first node to a fifth node, and a switching network. The switching network includes a first switching device, a second switching device, and a third switching device. The first switching device is an access device of the first node and the fifth node, and both the first node and the fifth node are compute nodes. The second switching device is an access device of the second node, the third node, and the fourth node, and the second node, the third node, and the fourth node are all storage nodes. The first switching device in this embodiment is equivalent to the switching device 110 shown in FIG. 1, the switching devices 210a to 210c shown in FIG. 2, or the switching devices 310a and 310b shown in FIG. 3. The method includes steps 601 to 605. The first node to the fifth node are equivalent to the node 120 shown in FIG. 1, the node 220 shown in FIG. 2, or the node 320 shown in FIG. 3.

The following describes, based on a node online/offline sequence, the node isolation method provided in the present disclosure.

601: The second node accesses the second switching device.

The second node accesses the second switching device, and another switching device in the switching network may also obtain a message indicating that the second node goes online.

The second node is the $1^{st}$ node that goes online in the first zone. According to the node isolation method provided in the present disclosure, the second switching device denies, by default, packet forwarding between all nodes.

602: The first node accesses the first switching device.

After the first node accesses the first switching device, the first switching device determines that the first node corresponds to the first zone, and the first zone further includes the second node that is online. The first switching device determines an ACL rule to permit packet interworking between the first node and the second node. The ACL rule includes: a packet whose source is the first node and whose destination is the second node; and a packet whose destination is the first node and whose source is the second node. Optionally, if the fourth node is also online before the first node goes online, the first switching device may further determine an ACL rule between the first node and the fourth node. A specific method is not described herein again.

It should be noted that, because the second switching device may also sense, through the switching network, that the first node goes online, the second switching device may also determine the ACL rule to permit the packet interworking between the first node and the second node, that is, permit the packet whose source is the second node and whose destination is the first node, and permit the packet whose destination is the second node and whose source is the first node.

603: The third node accesses the second switching device.

After the third node accesses the second switching device, because both the third node and the second node are storage nodes, the second switching device does not deliver an ACL rule between the second node and the third node. Because the first node and the third node have different roles, the second switching device determines an ACL rule between the first node and the third node. Optionally, if the fifth node is online, the second switching device further determines an ACL rule between the third node and the fifth node.

In addition, after sensing that the third node goes online, the first switching device may deliver the ACL rule between the first node and the third node.

604: The second node goes offline.

The second node goes offline, so that each edge device in the switching network may delete all ACL rules associated with the second node. Specifically, the second switching device deletes the ACL rule between the first node and the second node, and the first switching device deletes the ACL rule between the first node and the second node.

605: A node X sends a packet to the first node.

If the node X that is outside the first zone and in an unknown zone sends the packet to the first node, because the packet does not match the ACL rule determined by the first switching device, the first switching device refuses to forward the packet to the first node.

Figure 7:
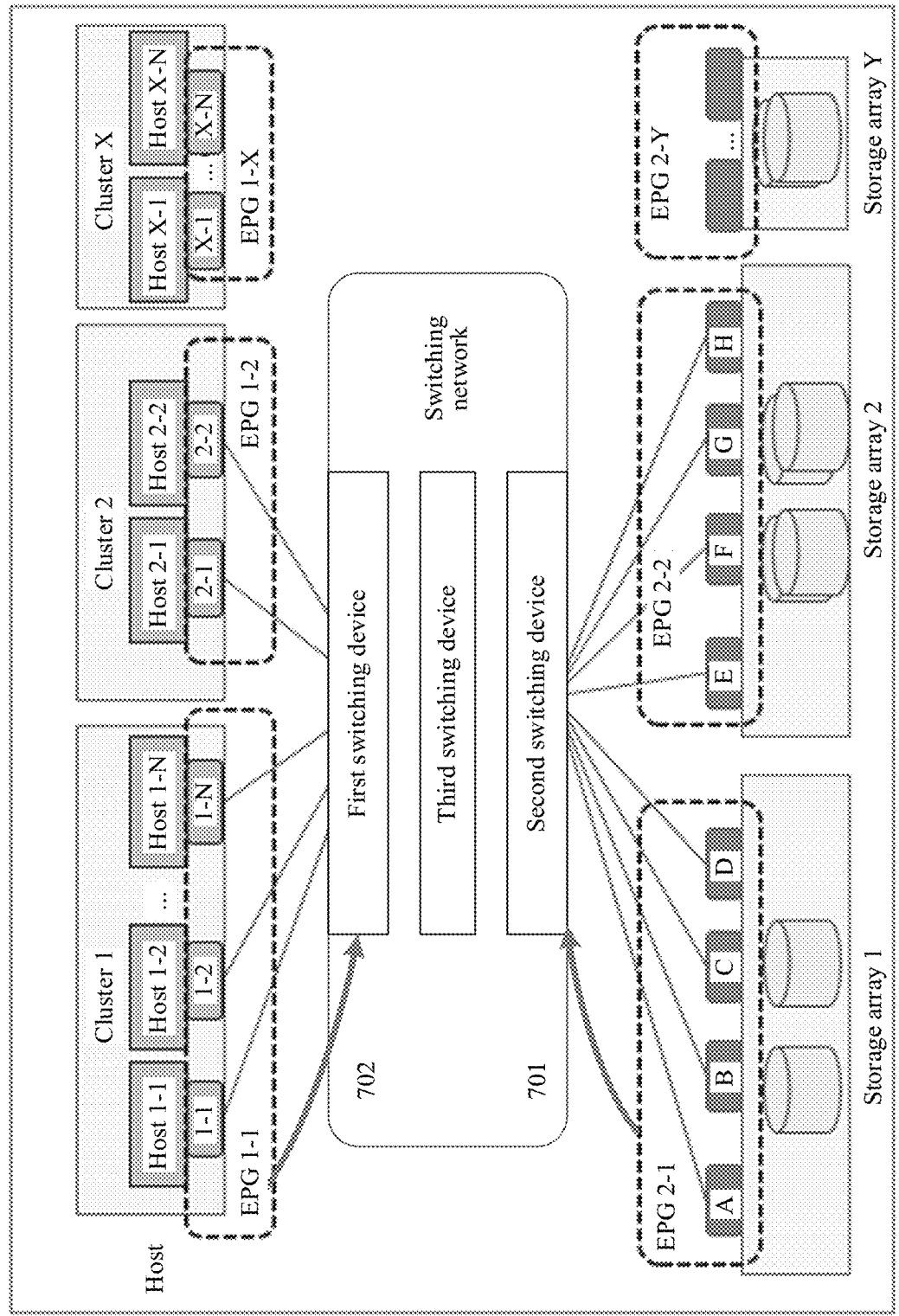
FIG. 7 is a schematic diagram of another embodiment of a node isolation method according to an embodiment of the present disclosure.

FIG. 7 is a schematic diagram of another embodiment of a node isolation method according to an embodiment of the present disclosure. In a large-scale access scenario of a data center storage network, there are a large quantity of compute nodes and storage nodes, a massive quantity of ACL rules need to be configured, and a massive quantity of ACL resources (that is, resources that are in a TCAM chip and that are used to store ACL rules) are occupied. However, ACL resources of a switching device are limited. When the ACL resources are insufficient, an end point group (EPG) mechanism may be further used in node grouping. The following describes a node grouping policy and a process of generating the ACL rules based on node groups.

For example, a first zone includes a switching network and a plurality of node groups that are shown in FIG. 7 (the figure shows node groups EPG 1-1 to EPG 1-X and EPG 2-1 to EPG 2-X). The switching network includes a first switching device, a second switching device, and a third switching device. Nodes in the node groups EPG 1-1 to EPG 1-X are compute nodes. In an actual service, the compute nodes are also called hosts. A node group including a plurality of hosts is also called a cluster. In FIG. 7, compute nodes in a same computing cluster are added to the same node group EPG 1-1. Nodes in the node groups EPG 2-1 to EPG 2-X are all storage nodes, and a plurality of storage nodes included in the node groups may correspond to one storage array. The nodes in the node groups have a same mutual access relationship. The node group EPG 1-1 includes nodes 1-1 to 1-N, and an access device of the nodes 1-1 to 1-N is the first switching device. The node group EPG 2-1 includes nodes A to D, and an access device of the nodes A to D is the second switching device. The first switching device in this embodiment is equivalent to the switching device 110 shown in FIG. 1, the switching devices 210*a* to 210*c* shown in FIG. 2, or the switching devices 310*a* and 310*b* shown in FIG. 3. The nodes in the plurality of node groups are equivalent to the node 120 shown in FIG. 1, the node 220 shown in FIG. 2, or the node 320 shown in FIG. 3. A node that does not belong to an EPG is an unknown EPG node. A packet between the node and another EPG is denied because a node group ACL rule is not matched.

The following uses communication between the node group EPG 1-1 and the node group EPG 2-1 as an example for description.

701: The node A accesses the second switching device.

The second switching device receives an online message of the node A, and determines, based on an identifier of the node A, that the node A belongs to the EPG 2-1, where the node A is the only online node in the EPG 2-1. The second switching device may determine an ACL rule between the EPG 2-1 and another node group in the first zone.

Optionally, if no other node group in the first zone has an online node, based on the node isolation method provided in the present disclosure, the second switching device denies, by default, communication between all nodes in the EPG 2-1 and a node outside the group.

702: The node 1-1 accesses the first switching device.

The first switching device receives an online message of the node 1-1, and determines, based on an identifier of the node 1-1, that the node 1-1 belongs to the EPG 1-1, where the node 1-1 is the only online node in the EPG 1-1. In this case, the first switching device may determine a first node group ACL rule between the EPG 1-1 and the EPG 2-1 in the first zone. The first node group ACL rule includes: a packet whose source is the EPG 1-1 and whose destination is the EPG 2-1; and a packet whose destination is the EPG 1-1 and whose source is the EPG 2-1. Optionally, if another node group (for example, a fourth node group) is also online before the EPG 1-1 goes online, the first switching device may further determine an ACL rule between the EPG 1-1 and the another node group. A specific method is not described herein again.

It should be noted that, because the second switching device may also sense, through the switching network, that the node in the EPG 1-1 goes online, the second switching device may also determine the node group ACL rule to permit packet interworking between the EPG 1-1 and the EPG 2-1, that is, permit the packet whose source is the EPG 2-1 and whose destination is the EPG 1-1, and permit the packet whose source is the EPG 2-1 and whose destination is the EPG 1-1.

Optionally, if the node 1-2 goes online after the node 1-1 goes online, the first switching device determines, based on an identifier of the node 1-2, that the node 1-2 belongs to the EPG 1-1. Because the first switching device has determined the ACL group rule between the EPG 1-1 and the EPG 2-1, the first switching device does not need to determine a new ACL rule. In other words, when the $1^{st}$ node in a node group goes online, the switching device is triggered to generate an ACL rule. When the last node in a node group goes offline, the switching device is triggered to delete an ACL rule associated with the node group.

In another possible implementation, the switching device may store only local device-related node group information. The first ACL rule includes: a packet whose source is a first node group in the inbound direction; and a packet whose destination is the first node group and whose source is a second node group in the outbound direction. In other words, the first node group ACL rule does not limit a packet sent by the first node group, and is used to perform rule confirmation on a source node group and a destination node group of the packet only in an outbound direction of the packet. In this way, the first switching device may not need to store information about a node group connected to another switching device, and storage resources can be saved.

Figure 8:
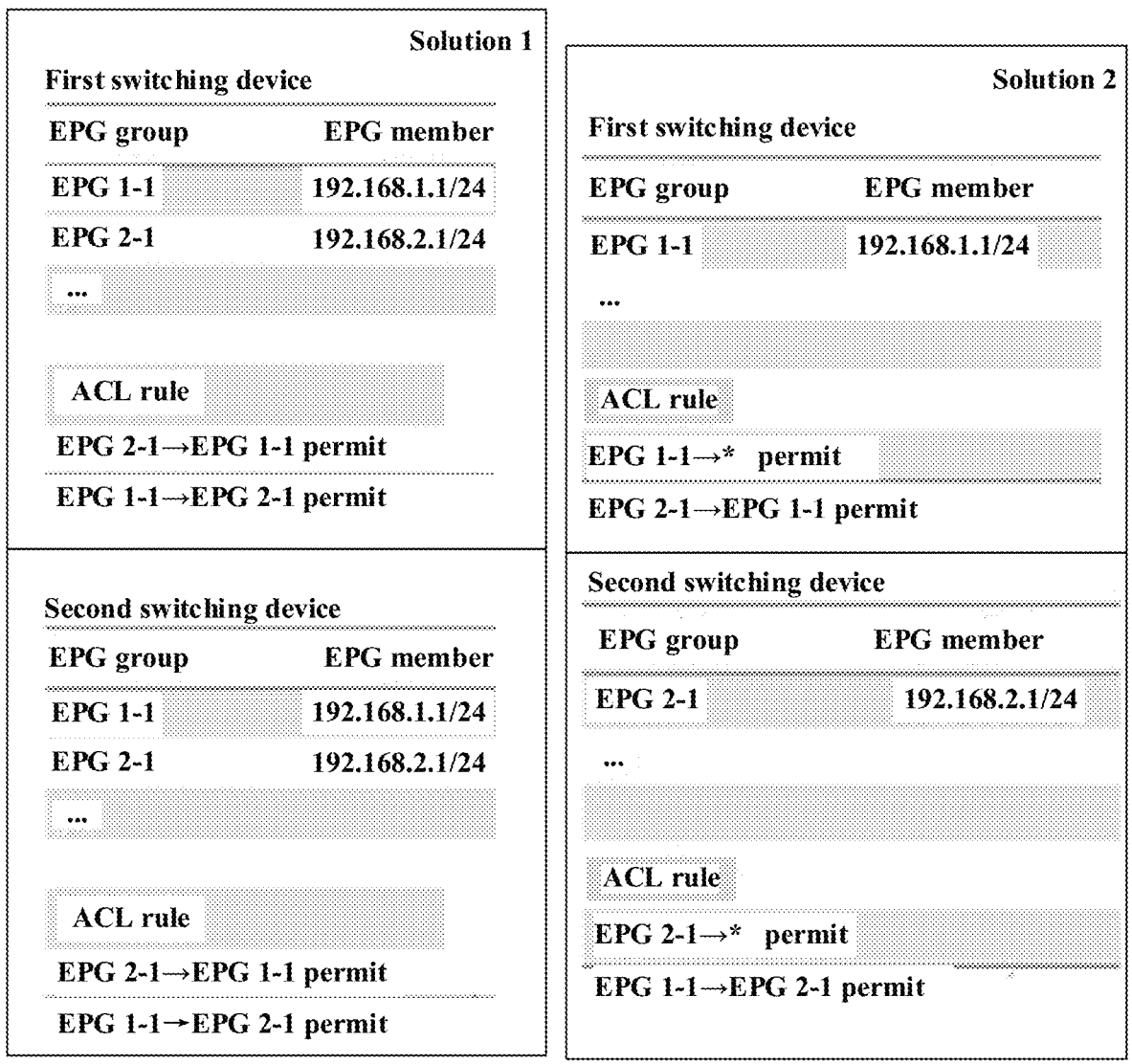
FIG. 8 is a schematic diagram of storing information by a switching device according to an embodiment of the present disclosure.

Refer to FIG. 8. In Solution 1, the first switching device needs to store information about the first node group, information about the second node group, and the node group ACL rule (that is, an EPG policy). The second switching device needs to store the information about first node group, the information about the second node group, and the node group ACL rule (that is, the EPG policy).

In Solution 2, the switching device stores only local device-related node group information. The first switching device only stores information about the first node group and the node group ACL rule (that is, the EPG policy). The second switching device only stores information about the second node group and the node group ACL rule (that is, an EPG policy).

It can be learned from FIG. 8 that, compared with Solution 1, in Solution 2, more storage resources are saved.

Figure 9:
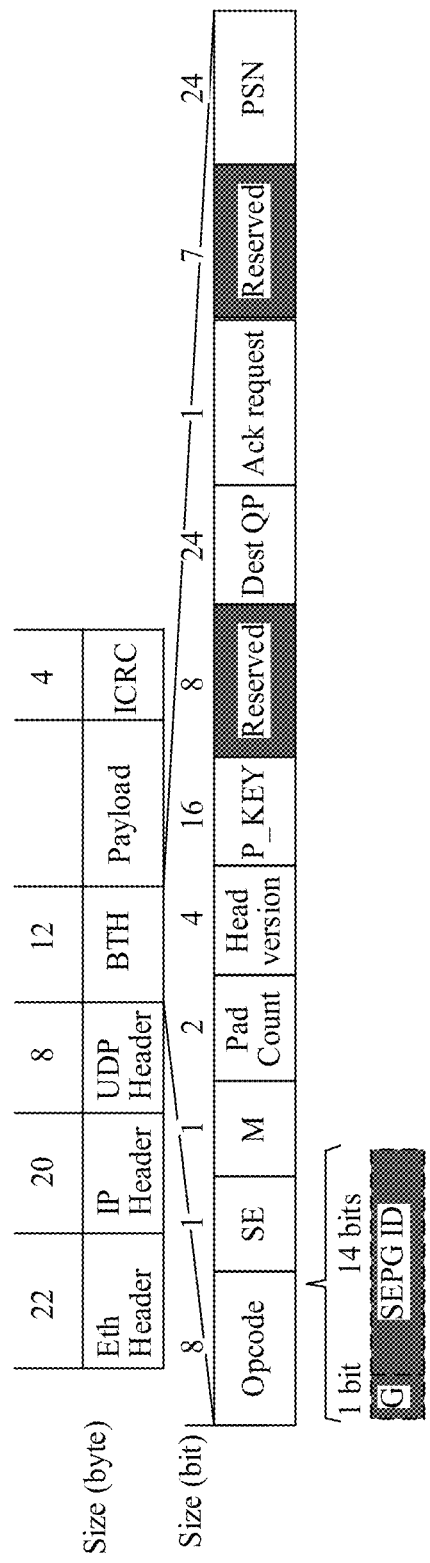
FIG. 9 is a schematic diagram of a communication packet according to an embodiment of the present disclosure.

Specifically, the first switching device receives a first packet whose source is a first node; determines, based on an IP address of the first packet, a first node group identifier corresponding to the first node; adds the first node group identifier to the first packet to obtain a second packet; and processes the second packet according to the first node group ACL rule. Refer to FIG. 9. This embodiment of the present disclosure provides a Remote Direct Memory Access (RDMA) over Converged Ethernet (RoCE) packet, and a source EPG (SEPG) identifier (ID) is carried through a reserved field. The second packet includes the first node group identifier, and a location of the first node group identifier may be located in a reserved field identified in FIG. 9. As shown in FIG. 9, two fields are 15 bits (bits) in total, including a 1-bit G field with a default value of 0. When a flag bit is 1, it indicates that a 14-bit reserved field in a packet header carries a source node group identifier (SEPG ID).

Figure 10:
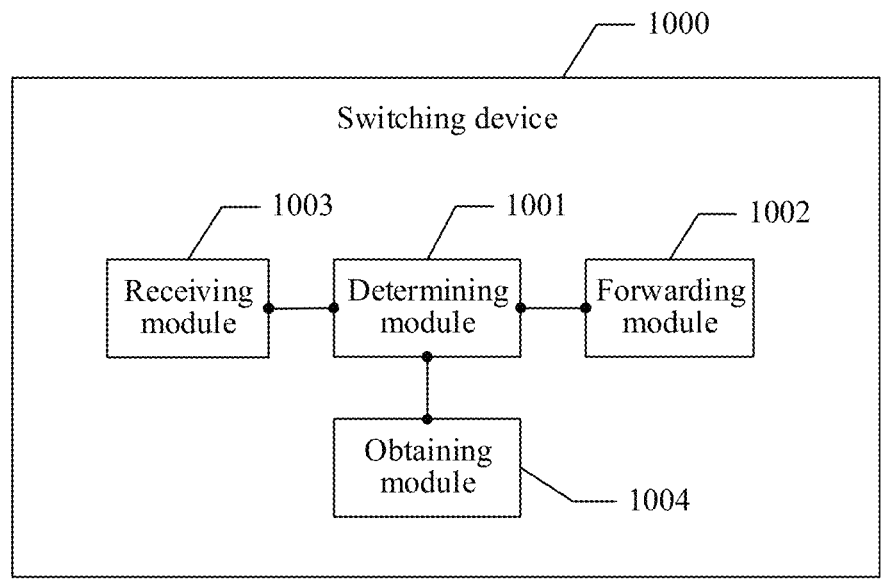
FIG. 10 is a schematic diagram of an embodiment of a switching device according to an embodiment of the present disclosure.

The foregoing embodiment describes the node isolation method provided in the present disclosure. The following describes a switching device that implements the node isolation method. Refer to FIG. 10. This embodiment of the present disclosure provides a switching device 1000, including: a determining module 1001 configured to determine a first access control list ACL rule between a first node and a second node, where a first switching device is an access device of the first node, the first node and the second node are located in an Ethernet storage system, and the first node and the second node correspond to a first zone; and a forwarding module 1002 configured to: if a packet whose source is the first node or a packet whose destination is the first node matches the first ACL rule, forward the packet.

In a possible implementation, the first ACL rule includes one or more of the following: a packet whose source is the first node and whose destination is the second node in an inbound direction; and a packet whose destination is the first node and whose source is the second node in an outbound direction.

In a possible implementation, the determining module 1001 is specifically configured to: determine the first ACL rule if the first node and the second node have different roles, where the roles include a compute node, a storage node, or a composite node; or determine the first ACL rule if both the first node and the second node are composite nodes, where the composite node is a storage node related to data backup.

In a possible implementation, before determining the first ACL rule between the first node and the second node, the switching device further includes: a receiving module 1003 configured to receive an online message of the first node, where the online message of the first node includes an identifier of the first node; and the determining module 1001 is further configured to: determine, based on the identifier of the first node, the first zone corresponding to the first node; and determine the second node based on the first zone, where the second node is an online node corresponding to the first zone.

In a possible implementation, the switching device further includes: an obtaining module 1004 configured to: obtain an offline message of the second node or a zone update message of the second node, where the zone update message indicates that the second node is switched from the first zone to a second zone; and the determining module 1001 is further configured to delete the first ACL rule based on the offline message or the zone update message of the second node.

In a possible implementation, the Ethernet storage system further includes a third node, the third node corresponds to the first zone, an access device of the third node is a second switching device in the Ethernet storage system, the obtaining module 1004 is further configured to: obtain an online message of the third node, where the online message of the third node includes an identifier of the third node; and the determining module 1001 is further configured to determine, based on the identifier of the third node, that the third node corresponds to the first zone; and determine a second ACL rule between the first node and the third node, where the second ACL rule includes one or more of the following: a packet whose source is the first node and whose destination is the third node in the inbound direction; and a packet whose destination is the first node and whose source is the third node in the outbound direction.

In a possible implementation, the obtaining module 1004 is further configured to: obtain an offline message of the first node; and the determining module 1001 is further configured to delete the first ACL rule and the second ACL rule based on the offline message of the first node.

In a possible implementation, the Ethernet storage system includes a first node group and a second node group, both a node in the first node group and a node in the second node group correspond to the first zone, the first node group includes the first node, the second node group includes the second node, and any node in the first node group is different from any node in the second node group; the determining module 1001 is further configured to determine, based on an identifier of the first node, that the first node corresponds to the first node group; and the determining module 1001 is specifically configured to: determine a first node group ACL rule between the first node group and the second node group, where the first node group ACL rule is used to determine an access rule between any node in the first node group and any node in the second node group.

In a possible implementation, the first node group ACL rule includes one or more of the following: a packet whose source is the first node group and whose destination is the second node group in the inbound direction; and a packet whose destination is the first node group and whose source is the second node group in the outbound direction.

In a possible implementation, all nodes in the first node group have a same role, and all nodes in the second node group have a same role; and the determining module 1001 is specifically configured to: determine the first node group ACL rule if the first node and the second node have different roles, where the roles include a compute node, a storage node, or a composite node; or determine the first node group ACL rule if both the first node and the second node are composite nodes, where the composite node is a storage node related to data backup.

In a possible implementation, the Ethernet storage system further includes a third node group, the third node group corresponds to the first zone, the third node group includes a third node, any node in the third node group is different from any node in the first node group, any node in the third node group is different from any node in the second node group, and an access device of the third node is a second switching device in the Ethernet storage system; the obtaining module 1004 is further configured to: obtain an online message of the third node, where the online message of the third node carries an identifier of the third node; and the determining module 1001 is further configured to: determine, based on the identifier of the third node, that the third node corresponds to the third node group, and the third node group corresponds to the first zone; and determine a second node group ACL rule between the first node group and the third node group, where the second node group ACL rule includes one or more of the following: a packet whose source is the first node group and whose destination is the third node group in the inbound direction; and a packet whose destination is the first node group and whose source is the third node group in the outbound direction.

In a possible implementation, the first node group ACL rule includes: a packet whose source is the first node group in the inbound direction; and a packet whose destination is the first node group and whose source is the second node group in the outbound direction.

In a possible implementation, the receiving module 1003 is further configured to: receive a first packet whose source is the first node; the determining module 1001 is further configured to determine, based on a source IP address of the first packet, a first node group identifier corresponding to the first node; and the forwarding module 1002 is further configured to: add the first node group identifier to the first packet to obtain a second packet; and process the second packet according to the first node group ACL rule.

In a possible implementation, the obtaining module 1004 is further configured to receive a third packet, where the third packet includes a second node group identifier and a destination IP address, the destination IP address is an IP address of the first node, and the second node group identifier indicates that the third packet is from a node in the second node group; the determining module 1001 is further configured to determine, based on the destination IP address, that a destination of the third packet belongs to the first node group; and the forwarding module 1002 is further configured to: forward the second packet to the first node according to the first node group ACL rule.

It should be understood that division of units of the switching device 1000 is merely logical function division. In actual implementation, all or some of the units may be integrated into one physical entity, or may be physically separated. In addition, these units may all be implemented in a form of software invoked by using a processing element; or may all be implemented in a form of hardware; or some units may be implemented in a form of software invoked by using a processing element, and some units are implemented in a form of hardware. For example, the foregoing units may be configured as one or more integrated circuits for implementing the foregoing methods, such as one or more application-specific integrated circuits (ASICs), one or more microprocessors (DSPs), or one or more field-programmable gate arrays (FPGAs). For another example, when one of the foregoing units is implemented in a form of a processing element scheduling a program, the processing element may be a general-purpose processor, for example, a central processing unit (CPU) or another processor that can invoke a program. For still another example, the units may be integrated and implemented in a form of a system-on-a-chip (SOC).

Figure 11:
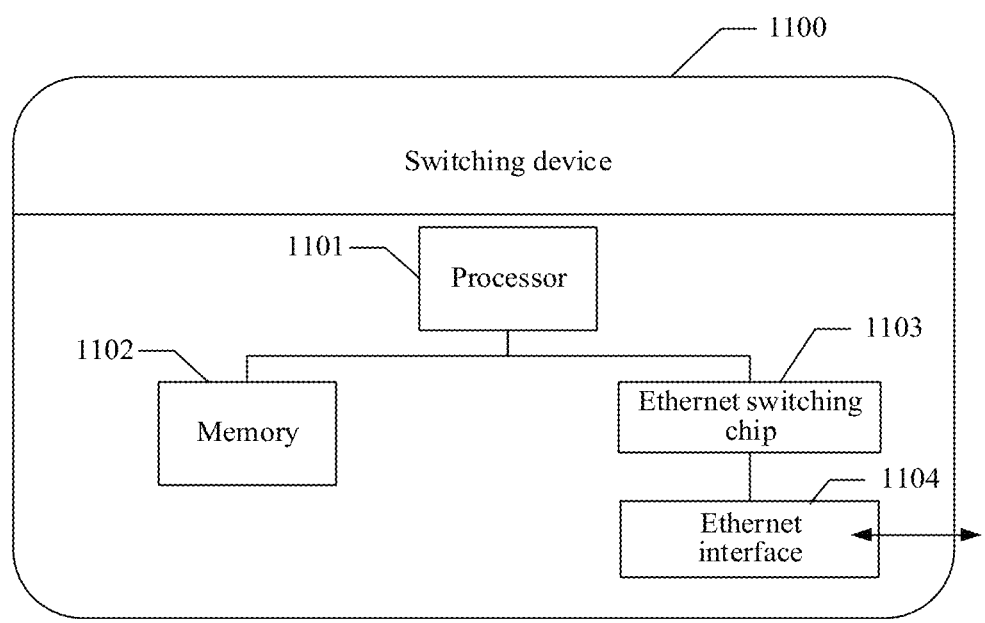
FIG. 11 is a schematic diagram of another embodiment of a switching device according to an embodiment of the present disclosure.

Refer to FIG. 11. This embodiment of the present disclosure provides a switching device.

The switching device provided in this embodiment is an Ethernet switching device. A specific device form of the switching device is not limited in this embodiment of the present disclosure.

A switching device 1100 may have a large difference due to different configurations or performance, and may include one or more processors 1101 and memories 1102. The memory 1102 stores a program or data.

The memory 1102 may be a volatile memory or a non-volatile memory. Optionally, the processor 1101 is one or more central processing units (CPUs), and the CPU may be a single-core CPU, or may be a multi-core CPU. The processor 1101 may communicate with the memory 1102, and execute, on the switching device 1100, a series of instructions in the memory 1102.

The switching device 1100 includes an Ethernet switching chip 1103, and the processor 1101 may control the Ethernet switching chip 1103 to perform initialization, deliver a service entry, receive and send a protocol packet, and perform various interruptions. Optionally, the Ethernet switching chip 1103 further includes a built-in TCAM chip. A most widely used purpose of the TCAM chip is quick search and access control. Due to costs and power consumption, TCAM entry resources for storing ACL rules are not too large, and are key resources of the network device.

The switching device 1100 further includes one or more Ethernet interfaces 1104 configured to receive and send a packet.

Optionally, although not shown in FIG. 11, the switching device 1100 may further include one or more power supplies and one or more input/output interfaces. The input/output interface may be configured to connect to a display, a mouse, a keyboard, a touchscreen device, a sensing device, or the like. The input/output interface is an optional component, and may or may not exist, and this is not limited herein.

For a process executed by the processor 1101 in the switching device 1100 in this embodiment, refer to the method process described in the foregoing method embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to a conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes: any medium that can store program code, a Universal Serial Bus (USB) flash drive, a removable hard disk, a read-only memory (ROM), a random-access memory (RAM), a magnetic disk, an optical disc, and the like.

In conclusion, the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A method implemented by a first switching device in an Ethernet storage system, wherein the method comprises:
   determining a first access control list (ACL) rule between a first node and a second node, wherein the first switching device is a first access device of the first node, wherein the first node and the second node are located in the Ethernet storage system, and wherein the first node and the second node correspond to a first zone;
   receiving a first packet having a source or a destination as the first node;
   determining that the first packet matches the first ACL rule;
   forwarding, in response to the first packet matching the first ACL rule, the first packet;
   obtaining a first offline message or a zone update message of the second node, wherein the zone update message indicates that the second node is switched from the first zone to a second zone; and
   deleting the first ACL rule based on the first offline message or the zone update message of the second node.

2. The method of claim 1, wherein the first ACL rule comprises one or more of the following:
   a second packet whose source is the first node and whose destination is the second node in an inbound direction; or
   a third packet whose destination is the first node and whose source is the second node in an outbound direction.

3. The method of claim 1, wherein determining the first ACL rule comprises:
   determining the first ACL rule based on the first node and the second node having different roles, wherein the different roles comprise a compute node, a storage node, or a composite node; or
   determining the first ACL rule based on both the first node and the second node being composite nodes, wherein the composite nodes are storage nodes related to data backup.

4. The method of claim 1, wherein before determining the first ACL rule, the method further comprises:
   receiving an online message of the first node, wherein the online message comprises an identifier of the first node;
   determining, based on the identifier, the first zone corresponding to the first node; and
   determining the second node based on the first zone, wherein the second node is an online node corresponding to the first zone.

5. The method of claim 1, further comprising:
   obtaining an online message of a third node of the Ethernet storage system, wherein the third node corresponds to the first zone, wherein a second switching device in the Ethernet storage system is a second access device of the third node, and wherein the online message of the third node comprises an identifier of the third node;
   determining, based on the identifier, that the third node corresponds to the first zone; and
   determining a second ACL rule between the first node and the third node in response to the third node corresponding to the first zone, wherein the second ACL rule comprises one or more of the following:
   a packet whose source is the first node and whose destination is the third node in an inbound direction; or
   a packet whose destination is the first node and whose source is the third node in an outbound direction.

6. The method of claim 5, further comprising:
   obtaining a second offline message of the first node; and
   deleting the second ACL rule based on the second offline message of the first node.

7. The method of claim 1, further comprising determining, based on an identifier of the first node, that the first node corresponds to a first node group of the Ethernet storage system, wherein the first node group comprises the first node, and wherein determining the first ACL rule comprises determining a first node group ACL rule between the first node group and a second node group of the Ethernet storage system, wherein the second node group comprises the second node, wherein the first node group ACL rule determines an access rule between nodes in the first node group and the second node group.

8. The method of claim 7, wherein the first node group ACL rule comprises one or more of the following:
   a second packet whose source is the first node group and whose destination is the second node group in an inbound direction; or
   a third packet whose destination is the first node group and whose source is the second node group in an outbound direction.

9. The method of claim 8, wherein the first node group ACL rule comprises:
   a fourth packet whose source is the first node group in an inbound direction; and a fifth packet whose destination is the first node group and whose source is the second node group in an outbound direction.

10. The method of claim 9, further comprising:
receiving a sixth packet whose source is the first node;
determining, based on a source Internet Protocol (IP) address of the sixth packet, a first node group identifier corresponding to the first node;
adding the first node group identifier to the sixth packet to obtain a seventh packet; and
processing the seventh packet according to the first node group ACL rule.

11. The method of claim 10, further comprising:
receiving an eighth packet, wherein the eighth packet comprises a second node group identifier and a destination IP address of the first node, and wherein the second node group identifier indicates that the eighth packet is from a third node in the second node group;
determining, based on the destination IP address, that a destination of the eighth packet belongs to the first node group; and
forwarding the eighth packet to the first node according to the first node group ACL rule.

12. The method of claim 7, wherein all first nodes in the first node group have a first same role and all second nodes in the second node group have a second same role, and wherein determining the first node group ACL rule comprises:
determining the first node group ACL rule based on the first node and the second node having different roles, wherein the different roles comprise a compute node, a storage node, or a composite node; or
determining the first node group ACL rule based on both the first node and the second node being composite nodes, wherein the composite nodes are storage nodes related to data backup.

13. The method of claim 7, further comprising:
obtaining an online message of a third node of a third node group of the Ethernet storage system, wherein the third node group corresponds to the first zone, wherein the first node group, the second node group, and the third node group comprise completely different nodes, wherein a second switching device in the Ethernet storage system is a second access device of the third node, and wherein the online message of the third node carries an identifier of the third node;
determining, based on the identifier, that the third node corresponds to the third node group; and
determining a second node group ACL rule between the first node group and the third node group, wherein the second node group ACL rule comprises one or more of the following:
a second packet whose source is the first node group and whose destination is the third node group in an inbound direction; and
a third packet whose destination is the first node group and whose source is the third node group in an outbound direction.

14. A switching device comprising:
a memory configured to store instructions; and
one or more processors coupled to the memory and configured to execute the instructions to cause the switching device to:
determine a first access control list (ACL) rule between a first node and a second node, wherein a first switching device is an access device of the first node, wherein the first node and the second node are located in an Ethernet storage system, and where in the first node and the second node correspond to a first zone;
receive a first packet having a source or a destination as the first node;
determine that the first packet matches the first ACL rule;
forward, in response to the first packet matching the first ACL rule, the first packet;
obtain an offline message or a zone update message of the second node, wherein the zone update message indicates that the second node is switched from the first zone to a second zone; and
delete the first ACL rule based on the offline message or the zone update message of the second node.

15. The switching device of claim 14, wherein the first ACL rule comprises one or more of the following:
a second packet whose source is the first node and whose destination is the second node in an inbound direction; or
a third packet whose destination is the first node and whose source is the second node in an outbound direction.

16. The switching device of claim 14, wherein the one or more processors are further configured to execute the instructions to cause the switching device to:
determine the first ACL rule based on the first node and the second node have different roles, wherein the different roles comprise a compute node, a storage node, or a composite node; or
determine the first ACL rule based on both the first node and the second node being composite nodes, wherein the composite nodes are storage nodes related to data backup.

17. The switching device of claim 14, wherein the one or more processors are further configured to execute the instructions to cause the switching device to:
receive an online message of the first node, wherein the online message comprises an identifier of the first node;
determine, based on the identifier, the first zone corresponding to the first node; and
determine the second node based on the first zone, wherein the second node is an online node corresponding to the first zone.

18. An Ethernet storage system comprising:
a first node;
a second node, wherein the first node and the second node correspond to a first zone; and
a first switching device, wherein the first switching device is an access device of the first node, and wherein the first switching device is configured to:
determine a first access control list (ACL) rule between a first node and a second node, wherein a first switching device is an access device of the first node, wherein the first node and the second node are located in an Ethernet storage system, and where in the first node and the second node correspond to a first zone;
receive a first packet having a source or a destination as the first node;
determine that the first packet matches the first ACL rule;
forward, in response to the first packet matching the first ACL rule, the first packet;
obtain an offline message or a zone update message of the second node, wherein the zone update message indicates that the second node is switched from the first zone to a second zone; and delete the first ACL rule based on the offline message or the zone update message of the second node.

* * * * *